Nov. 3, 1970                R. UNTERBERGER                3,537,763
                    HYDROSTATIC AIR-BEARING SYSTEM
                       Filed Aug. 9, 1968

INVENTOR
RICHARD UNTERBERGER
BY
ATTORNEY.

United States Patent Office 3,537,763
Patented Nov. 3, 1970

3,537,763
HYDROSTATIC AIR-BEARING SYSTEM
Richard Unterberger, Munich, Germany, assignor to Johannes Heidenhain, Traunreut, near Traunstein, Germany, a corporation of Germany
Filed Aug. 9, 1968, Ser. No. 751,421
Claims priority, application Germany, Aug. 10, 1967, 1,625,656
Int. Cl. F16c 17/16
U.S. Cl. 308—9                                    5 Claims

ABSTRACT OF THE DISCLOSURE

A hydrostatic air-bearing system preferably for precision round tables or the like, which comprise a stationary housing having air feeding nozzles and two rotation bearing inner parts coaxially centered by means of connecting elements and rotatably received in the stationary housing. The outer contours of the bearing inner parts are disposed symmetrically about an axis extending crosswise to the rotary axis of the bearing inner parts. The rotation bearing inner parts are secured at a constant distance relative to each other by means of an intermediate bent-resistant connecting element and are rigidly coupled together fitted into the housing.

---

Figure 1:
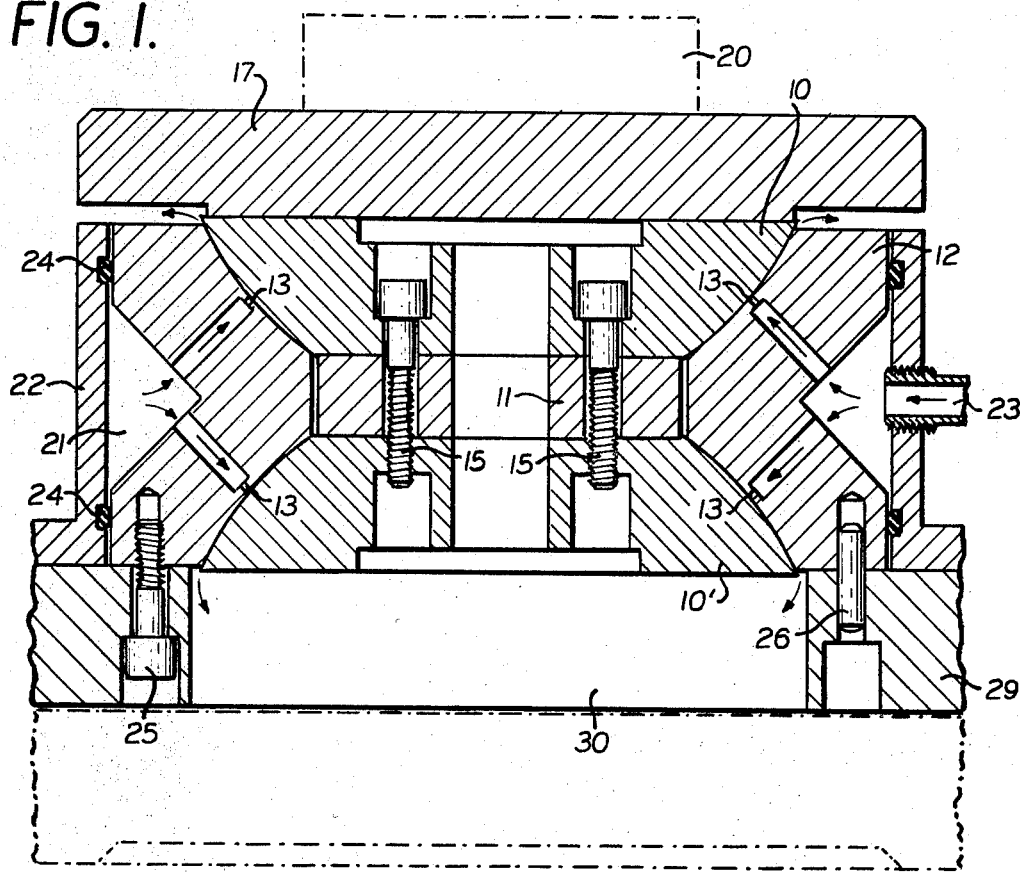

The present invention relates to a hydrostatic air-bearing system, in general, and preferably to such air-bearing system designed for precision round table or the like, in particular, which comprises two rotary bearing inner parts centered coaxially by means of connecting elements, which bearing inner parts are rotatably mounted in a stationary housing equipped with air feeding nozzles and in which their outer contours are disposed symmetrically about an axis extending crosswise to the rotary axis of the mentioned bearing inner parts.

In known air-bearing systems of this type, one of the bearing inner parts arranged rotatably in the housing is longitudinally displaceable on an axis serving as connecting element and is fed by means of a spring, for instance, a helical spring against the second bearing inner part immovably secured to the axis (U.S. Pat. No. 1,337,742).

It is a disadvantage of the known air-bearing system of this type, that with the spring provided for the production of a predetremined bearing pretension, no bearing stiffness can be obtained, as it would be desirable for a precision bearing, for instance, for particularly exact round tables, part heads and the like.

It is furthermore of a disadvantage that the spring used for the production of the bearing pretension causes an enlargement of the structural dimension, which renders unsuitable this type of bearing for different possibilities of application.

It is one object of the present invention to provide a hydorstatic air-bearing system, wherein the above-stated drawbacks of known air-bearing systems are avoided and a hydrostatic air-bearing system is provided which has a high bearing pretension required for the centering of the precision parts, as well as simultaneously a tight, constructively simple design and which is also characterized beyond that by a mechanical connection of the bearing inner parts rotatable in the housing, which mechanical connection influence favorably the bearing exactness.

It is another object of the present invention to provide a hydrostatic air-bearing system, wherein, for obtaining an optimum bearing pretension, the rotation bearing inner parts are secured at an exact distance relative to each other with intermediate arrangement of a connecting element which is rigid against bending and which is rigidly coupled together fitted in the surrounding housing.

It is still another object of the present invention to provide a hydrostatic air-bearing system in which preferably the element connecting the rotating symmetrical bearing inner parts comprises a distancing disc which is flat in relation to its diameter, on which distancing disc are immovably and rigidly clamped on both sides thereof the bearing inner parts coaxially centered by means of securing elements.

The advantages resulting from the invention are particularly pronounced, when the bearing supporting faces of the housing and of the rotatable bearing inner parts are of spherical shape. Beyond that, in a further development of the present invention, in which the housing, receiving the bearing inner parts, has a plurality of air feeding nozzles equally distributed over the periphery of the spherical bearing carrying faces, which air feed nozzles can control the pressure relations in the working slits independently from each other.

Figure 2:
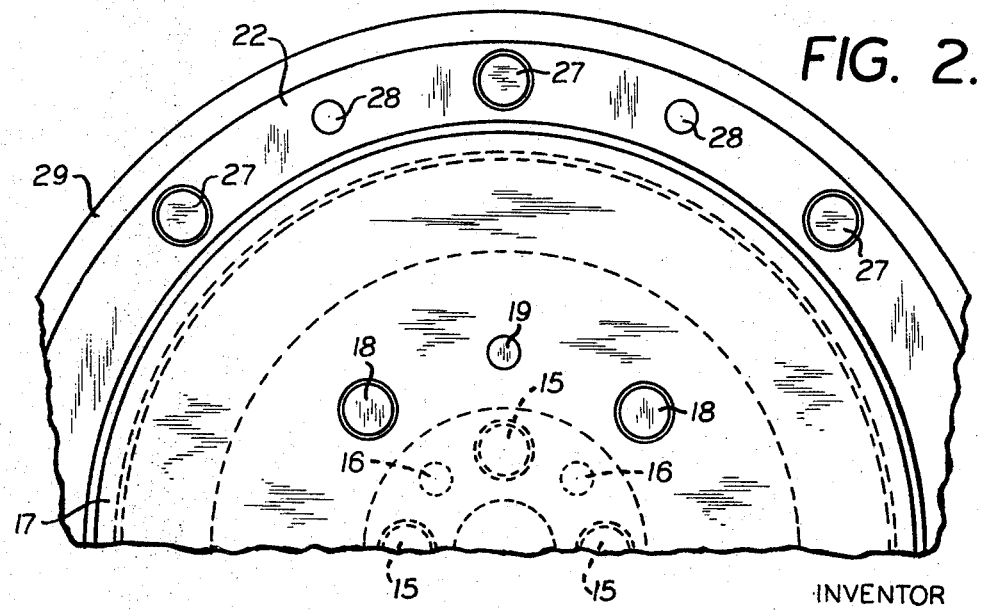

With these and other objects in view, which will become apparent in the following detailed description, which discloses the present invention by example only, the present invention will be clearly understood in connection with the accompanying drawing, in which:

FIG. 1 is an axial section of the hydrostatic air-bearing system given by example only and designed in accordance with the present invention; and FIG. 2 is a top plan view of the system disclosed in FIG. 1.

Referring now to the drawing, an air-bearing system designed in accordance with the present invention is disclosed in an application, for instance, for a precision around table for measuring or working of work pieces.

The air-bearing system comprises in its essential parts two rotation bearing inner parts 10 and 10', respectively, having outer contours which lie symmetrically about an axis running cross to the rotary axis of the bearing inner parts 10 and 10'; and which in accordance with the present invention are secured on a distancing disc 11 which is flat relative to its diameter by means of screws 15 and pins 16. The height of the mentioned distancing disc 11 is determined such, that in the operating state of the bearing, an optimum bearing slit is brought about between the rotation symmetrical bearing supporting faces. Due to the rigid coupling of the bearing inner parts 10 and 10' fit into the housing 12 by resiliency of the housing 12, the desired high pretensions are obtained which render suitable this bearing for the centering of parts of highest precision.

The bearing carrying faces of the housing 12 and of the bearing inner parts 10 and 10' are spherically formed, which offers in addition to an extremely exact and simple production of this part also the essential advantage in relation to the bearing exactness, that in possible radial displacements of the bearing inner parts formed as ball zones, the rotating axis is always produced by the connecting line of the center points of the two balls. In FIG. 1, on the bearing inner part 10, projecting the plane upper side of the housing 12, is immovably secured a mounting plate 17 of the round table by means of screws 18 and pins 19. The mounting plate 17 of the round table carries the work piece 20 which, for instance, is to be measured and worked, respectively, by means of a sensing system or working element (not shown).

In the housing 12, advantageously a plurality of air feeding nozzles 13 equally distributed over the periphery are arranged, which air-feeding nozzles 13 can be controlled independently from each other and which terminate in an annular channel 21, through which pressurized air is fed. The annular channel 21 is formed by a groove in the housing 12 and a ring 22 surrounding the housing 12, in which ring 22 is sealingly inserted a connecting member 23 for the pressurized air conduit (not shown). Between the same, sealing rings 24 are arranged on both sides of the annular channel 21, so that the channel 21 feeding pressurized air is hermetically closed relative to the atmosphere. The housing 12 and the ring 22 surrounding the same are secured immovably on a base plate 29 by means of screws 25 and 27, respectively, and pins 26 and 28, respectively, which base plate 29 has a break-through 30, the face range of which surrounds the lower bearing inner part 10'.

I claim:

1. A hydrostatic air-bearing system preferably for precision round tables or the like, comprising:
    a stationary housing having air feeding nozzles,
    two rotation symmetrical axially and radially bearing inner parts coaxially centered spaced from each other and rotatably received in said stationary housing, and said bearing inner parts having outer contours being symmetrical about an axis extending crosswise to the rotary axis of said bearing inner parts.
    securing elements,
    an intermediate connecting element axially disposed between said bearing inner parts, the latter being secured to said connecting element by means of said securing elements, and only securing said bearing inner parts by means of said securing elements at a constant distance relative to each other and rigidly coupled together in said housing, and
    said connecting element being rigid against bending and defining an outer diameter, and its axial height being a fraction of its outer diameter.

2. The hydrostatic air-bearing system, as set forth in claim 1, wherein:
    said connecting element comprises a distancing disc being flat in relation to its diameter, and
    a plurality of said securing elements disposed circumferentially through said connecting element and clamping said bearing inner parts theretogether on both sides of said distancing disc.

3. The hydrostatic air-bearing system, as set forth in claim 1, wherein:
    said bearing inner parts and said housing include abutting supporting faces which are of spherical shape.

4. The hydrostatic air-bearing system, as set forth in claim 3, wherein:
    said housing form air feeding nozzles, which air feeding nozzles are distributed along and communicate with the periphery of said spherical supporting faces of said housing.

5. The hydrostatic air-bearing system, as set forth in claim 3, wherein:
    said bearing inner parts each include a flat annular central portion facing each other,
    said spherical supporting faces of said bearing inner parts extend outwardly from the outer periphery of said flat annular central portions, and
    said connecting element comprises a disc having flat sides positioned against said flat annular central portions of said bearing inner parts and said outer diameter of said disc is substantially aligned with said outer periphery of said flat annular center portions.

References Cited
UNITED STATES PATENTS

| | | | |
|---|---|---|---|
| 3,193,334 | 7/1965 | Porath | 308—9 |
| 2,086,896 | 7/1937 | Carter | 308—9 |
| 2,919,960 | 1/1960 | Whitney | 308—122 |

FRED C. MATTERN, Jr., Primary Examiner

FRANK SUSKO, Assistant Examiner